April 11, 1961  A. O. ROBERTS  2,978,929
LOCKING DIFFERENTIAL
Filed Jan. 12, 1959  2 Sheets-Sheet 1
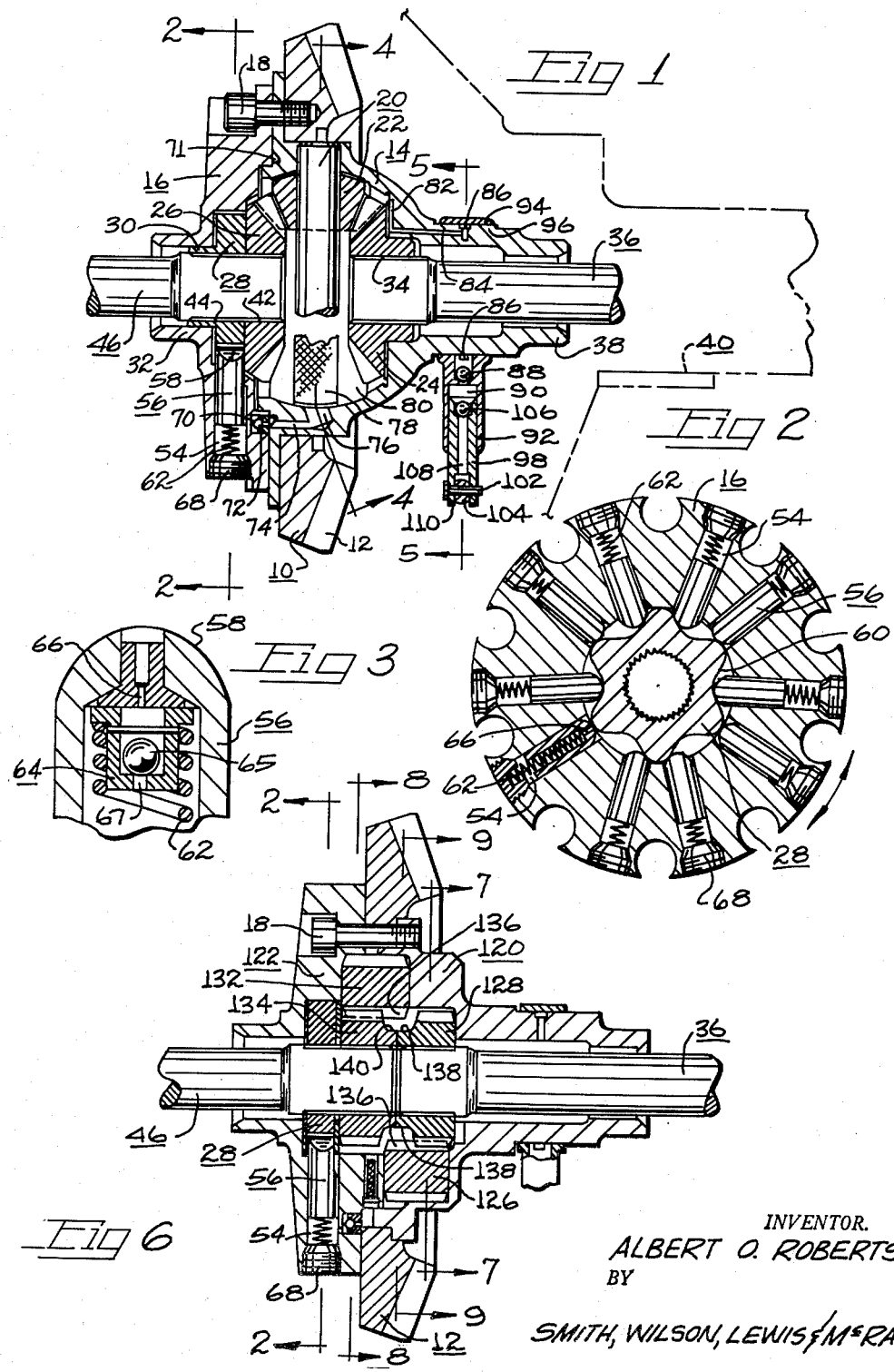
INVENTOR.
ALBERT O. ROBERTS
BY
SMITH, WILSON, LEWIS & McRAE April 11, 1961  A. O. ROBERTS  2,978,929
LOCKING DIFFERENTIAL
Filed Jan. 12, 1959  2 Sheets-Sheet 2
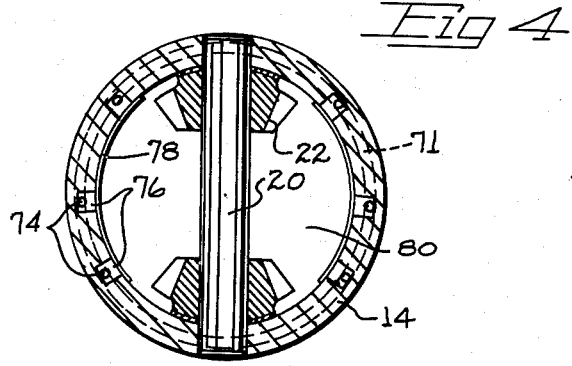
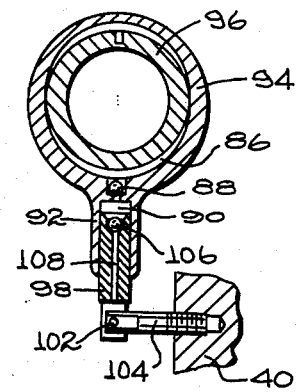
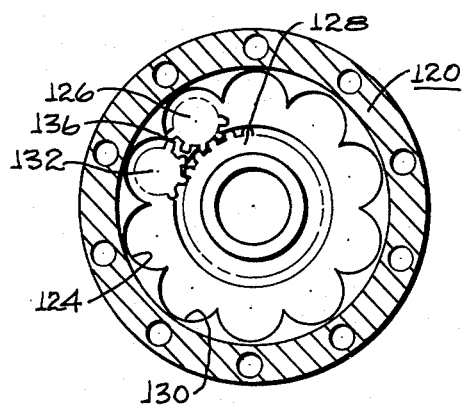
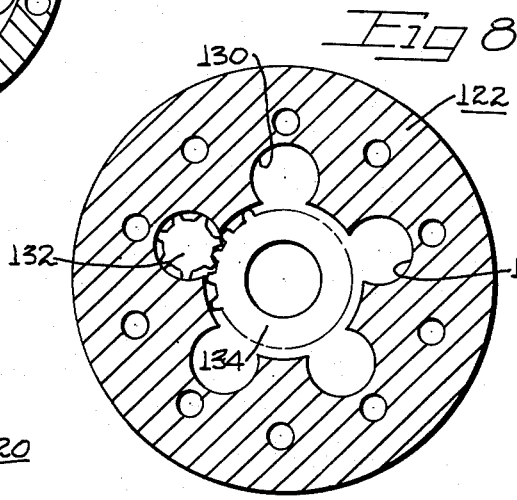
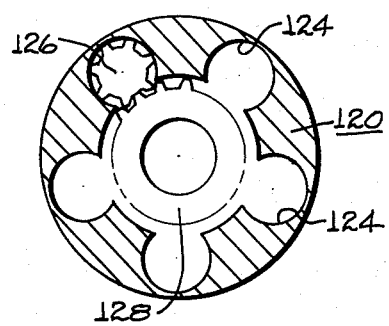
INVENTOR.
ALBERT O. ROBERTS
BY
SMITH, WILSON, LEWIS & McRAE

United States Patent Office 2,978,929
Patented Apr. 11, 1961

2,978,929
LOCKING DIFFERENTIAL

Albert O. Roberts, 116B Latta Road, Rte. 2, Durham, N.C., assignor of forty percent to Arthur M. Smith, Dearborn, Mich.

Filed Jan. 12, 1959, Ser. No. 786,159

6 Claims. (Cl. 74—711)

This invention relates to differentials operable upon the attainment of a predetermined difference in speed between the driving wheels of a vehicle to modify the torque dividing action of the differential to drive both wheels, maintaining substantially the same difference in speed to exert the major portion of the available torque on the wheel which has good traction.

Differential gearing is employed between the driving axles of vehicles to divide the torque received from a driving source and to exert substantially equal torque on spaced driving wheels. Difficulties have heretofore been encountered in the operation of vehicles where one of the driving wheels has poor traction as when it is on ice or in mud where the traction available to that wheel is materially less than the traction available to the other wheel, and the wheel having the poor traction therefore spins. The differential functions to divide the torque equally between the driving wheels, and when one wheel starts to spin no greater torque can be imparted to the wheel having good traction than to the wheel having poor traction, and which therefore is spinning. When the traction of one of the driving wheels has thus been lost, neither wheel can effectively drive the vehicle which is therefore "stuck."

Many attempts have been made to overcome these difficulties. These prior efforts have been directed primarily to the use of friction devices which function to vary the torque applied to the wheel which has the least traction to resist its rotation in an effort to impart greater torque to the wheel having good traction. Such devices are inefficient and cause erratic steering and other undesirable action in the control of the vehicle.

I have observed that when rounding curves, even the most severe curves which can be negotiated in the driving of a vehicle at high speeds, the difference between the speed of rotation of the driving wheels is approximately 20 r.p.m. as a maximum. In the development of my improved differential I have devised an hydraulically actuated device which is inoperative at low speed and therefore exerts substantially no influence on the torque dividing action of the differential until the difference in the speed of rotation of the driving wheels is approximately 20 r.p.m. When that difference in speed is approached my improved device becomes operative and exerts a progressively increasing retarding force on the spinning wheel as the difference in speed between the driving wheels increases.

An object of my invention is therefore to provide an hydraulic means for limiting the difference in speed between the driving wheels.

Another object of my invention is to provide a speed controlled hydraulically actuated device to prevent uncontrolled spinning of one of the driving wheels thereby insuring the transmission of a large portion of the applied torque to the wheel having the greatest traction.

Another object of my invention is to provide an hydraulic device driven by rotation of the differential gears relative to the case of the differential to impart a retarding force to relative rotation between the gears and case to transmit the available torque to drive the wheels substantially in proportion to variations in speed between the driving wheels.

A further object of my invention is to provide a controlled differential which functions after the attainment of a substantially predetermined difference in speed of the driving wheels to drive the wheels at a predetermined speed ratio relative to each other regardless of the degree of traction available to each of the wheels.

Yet another object of my invention is to provide an improved differential wherein one of the driving wheels is free to rotate relative to the other driving wheel at a speed substantially equal to the maximum difference of speed of the driving wheels while the vehicle rounds a curve, a speed limiting hydraulic control then becoming operative to resist further increase in differential speed.

Still another object of my invention resides in the provision of a compact speed controlled hydraulically actuated differential which can be installed in standard axles without substantial redesign or retooling, and wherein a desired speed ratio is maintained between the driving wheels.

Yet a further object of this invention is to provide a controlled differential which utilizes many standard parts of conventional differentials, and which thus provides a low-cost speed controlled differential to prevent spinning of one driving wheel relative to another.

Another object is to provide a speed controlled differential mechanism which may be applied to differentials of the bevel gear or spur gear types, and which functions to maintain the speed of rotation of the driving wheels within desired predetermined speed ratios relative to each other.

A further object of my invention resides in the provision of a light-weight combined hydraulic-mechanical differential controlling device which functions to maintain a desired speed ratio between spaced driving wheels.

Still another object of my invention is to provide an improved locking differential which may be manufactured economically and which functions to prevent uncontrolled spinning of one of the driving wheels relative to the other driving wheel.

Other objects of this invention will appear in the following description and appended claims, reference being had to the accompanying drawings forming a part of this specification wherein like reference characters designate corresponding parts in the several views.

Fig. 1 is a longitudinal sectional view of a bevel gear type differential embodying my invention.

Fig. 2 is a sectional view taken substantially on the line 2—2 of Figs. 1 or 6 looking in the direction of the arrows.

Fig. 3 is an enlarged fragmentary view of a portion of one of the hydraulically restrained plungers illustrated in Figs. 1 and 2.

Figs. 4 and 5 are sectional views taken substantially on the lines 4—4 and 5—5 respectively of Fig. 1 looking in the direction of the arrows.

Fig. 6 is a longitudinal sectional view of the spur gear type differential embodying my invention.

Figs. 7, 8 and 9 are sectional views taken substantially on the lines 7—7, 8—8 and 9—9 respectively of Fig. 6 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to Fig. 1, my invention is illustrated as applied to a vehicle differential having a ring gear 10 provided with angularly inclined gear teeth 12 adapted to be engaged and driven by a pinion gear driven by a propeller shaft having a universal joint, not shown. The ring gear 10 is secured to a rotatable assembly consisting of a differential case 14 and a differential case-cover 16 by means of screws 18 projecting through radially extended flanges carried by the differential case and cover members 14 and 16 respectively.

The differential case 14 is provided with a radially extended differential pinion shaft 20 positioned in aligned apertures in the differential case 14, the shaft 20 being held against radial displacement by the overlapping inner edge of the ring gear 10 when the device is assembled. In this embodiment of my invention the differential pinion shaft 20 is provided with differential pinions 22 of the bevel gear type adapted to mesh with and drive differential side gears 24 and 26, also of the bevel gear type.

A multi-lobed cam 28, such for example as a six lobed cam illustrated more clearly in Fig. 2, is mounted for example adjacent the left-hand differential side gear 26, and has a hub 30 journalled in the bearing seat 32 carried by the differential case cover 16.

The right-hand differential side gear 24 has internal splines 34 which engage the splined inner end of an axle shaft 36 to which a driving wheel is attached. The outer end of the differential case 14 is provided with a bearing seat 38 adapted to receive a suitable bearing by which the right-hand end of the differential case 14 is journalled within an axle carrier 40.

The left-hand differential side gear 26 is provided with internal splines 42, and the multi-lobed cam 28 has similar internal splines 44 to receive the inner splined end of an axle shaft 46 to which the other driving wheel is secured. It will be noted that bearing seat 32 carried by the differential case-cover 16 also receives a suitable bearing to journal the left-hand end of the case assembly 14—16 in the axle carrier 40. It will of course be apparent that if desired the cam member 28 may be formed integrally with the left-hand side gear 26.

The differential case-cover 16 is provided with a plurality of radial cylindrical bores 54 as more clearly shown in Figs. 1 and 2. Each of the radial bores 54 is provided with a radially movable plunger 56 having a rounded inner end or contoured nose 58 to engage in line contact, the outer contoured surfaces or lobes 60 of the cam 28.

The plungers 56 have hollow interiors to receive springs 62 which yieldingly urge the plungers radially inwardly in the bores 54 to maintain contact between the inner ends 58 of the plungers 56 and the contoured surfaces or lobes 60 of the cam 28. The inner ends of the plungers 56 are provided with check valves 64, more clearly shown in Fig. 3, and having calibrated orifices 66 to permit a controlled flow of fluid radially inwardly through the plungers 56 for discharge between the cover 16 and the cam member 28. The ball check valves 64, more clearly illustrated in Fig. 3, have ball members 65 to engage the inner surface of a member having an opening 67 to serve as a check valve to prevent the intake of air from the space between the cover 16 and the contoured surface 60 of the cam 28.

The springs 62 which hold the plungers 56 in contact with the cam are held in place by retaining plugs 68 threaded in the outer ends of the radial bores 54. The springs 62 may be calibrated to exert a desired inward thrust on the plungers 56 to maintain the rounded inner ends 58 of the plungers at all times in contact with the contoured outer surface 60 of the cam 28.

Fluid under light pressure is supplied to each of the plunger receiving radial bores 54 through apertures 70 communicating through the walls of the case-cover 16. An annular groove 71 formed in the differential case 14 interconnects the apertures 70, a check valve 72 being interposed between each of the apertures 70 and the annular groove 71 to permit the flow of oil into the radial bores 54 but to prevent the reverse flow of oil therefrom.

As shown in Fig. 4 the annular groove 71 may be supplied with fluid such for example as oil through a plurality of axially extending drilled holes 74 in the case 14 connected with a plurality of circumferentially spaced drilled holes 76 communicating through a screen 78 with the space 80 within the differential case 14 and cover 16.

Fluid may be supplied to the space 80 from any convenient source. In the embodiment illustrated a self-contained unit is provided wherein fluid is supplied through a radial groove 82 formed in the differential case 14, for example adjacent the right-hand differential side gear 24. The radial groove 82 communicates with an axially extending bore 84 connected with an annular circumferential groove 86 formed in the case 14. Fluid under pressure may be supplied to the annular groove 86 through a check valve 88 from a space 90 in a pump formed by an oscillating cylinder 92 carried by a yoke 94 mounted on an eccentric portion 96 of the hub on the differential case 14. A piston 98 is pivotally supported on a pin 102 secured in a stationary stud 104 in the axle carrier 40 for reciprocal movement in the cylinder 92 slidably mounted thereon. A check valve 106 is interposed between the space 90 and a bore 108 in the piston 98 communicating through an aperture 110 with the lubricant in the axle carrier 40 which cooperates with an axle housing to form a fluid reservoir in a known manner.

I have illustrated my invention as applied to a construction wherein ten radially movable plungers 56 carried by the case and cover assembly 14—16 are slidably mounted in the circumferentially spaced radial bores 54, the inner ends 58 of the plungers 56 being maintained in contact with the contoured surfaces or lobes 60 of the multi-lobed cam 28. The cam 28 and the left-hand side gear 26 are splined to the axle shaft 46 and therefore the cam 28 must move with the side gear 26.

It will be recalled that when the vehicle rounds a curve relative rotation is set up between the cam 28 and the case and cover assembly 14—16 due to the fact that the outer wheel travels a farther distance than does the inner wheel. The calibrated orifices 66 in the inner ends of the plungers 56 permit a sufficient flow of fluid through the plungers 56, to accommodate a differential of rotation between the inner and outer wheels of approximately 20 r.p.m. which is the approximate maximum differential of speed rotation which will be encountered as the vehicle rounds the tightest curve over which it can be driven.

It will thus be appreciated that during all normal operations of the vehicle my improved differential functions as does a standard differential and it will be apparent that no interference to the drive is interposed.

The operation is as follows. While the vehicle in which my improved differential is mounted is driving straight ahead, there is no relative rotational movement between the cam 28 splined to the shaft 46 and the differential case and cover assembly 14—16. The plungers 56 are at all times maintained in contact with the lobes 60 of the cam 28 by the springs 62, and oil under light pressure, supplied from the pump formed by the cylinder 92 and the piston 98, is maintained in the radial bores 54 and the outer ends of the plungers 56. The calibrated orifices 66 in the inner ends of the plungers 56 permit the escape of a sufficient quantity of oil from the bores 54 through the plungers 56 to permit slow rotation of the cam 28 and the axle shaft 46 relative to the case and cover assembly 14—16 to permit a relative rotation of approximately 20 r.p.m. to accommodate the sharpest curve about which the vehicle can be driven.

When one of the driving wheels loses its traction as when the vehicle is driven over ice or when one wheel gets in the mud, the wheel which has lost its traction will begin to spin. This results in increased relative rotational movement between the cam 28 and the casing-cover assembly 14—16 whereupon fluid under pressure is trapped in the radial bores 54 at the outer ends of the plungers 56. The calibrated orifices 66 will not permit the escape of fluid at a sufficiently high rate to accommodate the increased rotational speed between the shaft 46 and the cover and case assembly 14—16. When one wheel tends to rotate faster than the other by an amount greater than the approximate 20 r.p.m. the fluid is not permitted to escape through the orifices 66 sufficiently rapidly and fluid is therefore trapped in the bores 54 at the outer ends of the plungers 56 to resist outward movement of the plungers 56 in the bores 54. The lobes 60 of the cam 28 carried by the shaft 46 must shift the plungers 56 outwardly in the bores 54 formed in the case and cover assembly 14—16 to permit rotational movement of the shafts 36 and 46 relative to the casing-cover assembly 14—16. The fluid trapped in the bores 54 at the outer ends of the plungers 56 resist greater rotational speed of the shafts relative to the casing than is permitted by the calibrated orifices 66. The plungers 56 thus exert a braking force on the cam 28 which resists increased rotational movement of the shafts relative to the case. The shafts 36 and 46 being tied together through the gearing are both forced to rotate together at a speed dependent on the quantity of fluid forced through the orifices 66 in the plungers 56. The wheel having good traction must therefore rotate in order to permit the other wheel which has lost its traction to rotate. The vehicle will therefore not become stuck unless both wheels lose their traction.

Described another way it will be apparent that during straight ahead driving of the vehicle the axle shafts 36 and 46 rotate in the same direction and at the same speed, and there is no relative rotation between the case-cover assembly 14—16 and either of the axle shafts 36—46. When the vehicle rounds a curve the wheel on the outside of the curve travels a greater distance than does the wheel on the inside of the curve. To accommodate this difference in distance traveled the axle shafts 36 and 46 rotate relative to each other. The rotatable assembly consisting of the case-cover members 14—16 continues to be driven at the speed dictated by the drive shaft, and the axle shafts 36—46 rotate at appropriate speeds to accommodate the distance being traveled by their respective driving wheels. There is thus relative rotational movement between the relatively movable members consisting of the case-cover assembly 14—16 and the cam member 28 splined to the axle shaft 46. This rotation causes the plungers 56 to reciprocate in their cylindrical bores 54. The plungers are forced radially inwardly by means of the springs 62, and they are forced radially outward by the cam 28. The inward movement of the plungers draws oil in through check valves 72, the check valves 64 preventing the intake of air which would reduce the efficiency of the device. The outward movement of the plungers 56 compresses oil in cylindrical bores 54 forcing it through orifices 66, check valves 72 at the outer ends of the bores 54 having closed. The resistance to flow of fluid through the orifices 66 controls the outward speed of movement of the plungers 56 thereby offering a resistance to increase in the speed of rotation of the cam 28 carried by the shaft 46.

The right-hand axle shaft 36 being connected to the case-cover assembly 14—16 through the side gear 24 and the pinion gears 22 is prevented from spinning relative to the axle shaft 46. The torque from the prime mover is thus exerted on the wheel having good traction whereupon the danger of the vehicle becoming stuck is overcome, provided one of the driving wheels has good traction. The action of the cam is the same regardless of the direction of its rotation therefore the effect in controlling one driving wheel is the same as the effect on the other.

It will be apparent that if desired suitable relief valves can be employed to limit the maximum pressure which can be exerted in the bores 54 resisting outward movement of the plungers 56 to avoid overloading any part of the axle.

The embodiment illustrated in Figs. 6 to 9 is similar in many respects to that illustrated in Figs. 1 to 5. It will be noted that the ring gear 12 is secured to a rotatable assembly consisting of a case member 120 and a case-cover 122 by the screws 18. As shown in Fig. 7 the case member 120 has a plurality, five in the embodiment illustrated, of circumferentially spaced gear pockets 124 which receive spur gears 126 in rotating relation therein.

The gears 126 substantially fill the gear pockets 124, running clearance being provided between the outer peripheries of the gears 126 and the internal walls of the case 120 defining the pockets 124 so that it is unnecessary to employ bearings to support the gear members 126. As shown in the lower portion of Fig. 6 the gears 126 mesh with a side spur gear 128 splined to the axle shaft 36.

In like manner, as illustrated in Fig. 8, the cover assembly 122 of the case 120 is provided with a corresponding number of correspondingly spaced gear pockets 130 which receive a corresponding number of spur gears 132 which mesh at their inner peripheries with a side spur gear 134 splined to the left-hand axle shaft 46. Gears 132 and 126 are identical and gears 134 and 128 are identical.

As best shown in Fig. 6 it will be noted that the spur gears 126 positioned in the pockets 124 formed in the case 120, and the spur gears 132 positioned in the pockets 130 of the cover 122 are longer axially than the depth of their respective pockets 124 and 130. The pockets 124 and 130 in the case and cover members 120 and 122 are spaced circumferentially, as illustrated in Figs. 7 to 9, so that when assembled in the pockets the spur gears 126 and 132 overlap axially and mesh with each other as shown at 136 in Figs. 6 and 9. The pinion gears 126 carried by the case member 120 mesh with their respective side gear 128, and the pinion gears 132 carried by the cover 122 mesh with their side gear 134. The confronting ends of the side gears 128 and 134 are cut away at their outer peripheries as illustrated at 138 and 140 respectively, to prevent meshing engagement with the pinion gears 126 and 132 of the case and cover members 120 and 122 respectively.

The cam 28 is splined to the axle shaft 46 in the same manner as described in connection with the embodiment illustrated in Figs. 1 to 5, and the plungers 56 are slidably mounted in the circumferentially spaced radially extending cylindrical bores 54 of the cover member 122 in the same manner as in the previously described embodiment.

When torque is transmitted to the ring gear 12 the assembly consisting of the case 120 and the cover 122 rotates. When the vehicle is proceeding straight ahead the axle shafts 36 and 46 are driven in the same direction and at the same speeds as the case and cover assembly 120—122 and the ring gear 12 as previously described in connection with the Figs. 1 to 5 embodiment. When the vehicle rounds a curve, the wheel on the outside of the curve travels farther and therefore the wheel on that side rotates faster. For example, let it be assumed that a turn is being made to the left whereupon the axle shaft 36 will rotate faster than will the axle shaft 46. The rotatable assembly consisting of the case 120 and the cover 122 then rotates relative to the axle shafts 36 and 46. The speed of the case 120 and cover 122 being less than the speed of rotation of the axle shaft 36 and greater than the speed of rotation of the axle shaft 46.

The spur pinions 126 carried by the casing member 120 rotate in their respective pockets 124 and drive the side gear 128 at a faster speed to accommodate the increased distance over which the right-hand wheel must travel.

In like manner the spur pinions 132 carried in the pockets 130 of the case cover 122 rotate in the opposite direction from the pinions 126 to drive the side gear 134 and left-hand axle shaft 46 at a lower rate of speed than the drive of the right-hand side gear 128 and the axle shaft 36. The fact that, as shown in Fig. 9, the pinion gears 126 of the case 120 mesh with the gears 132 journalled in the cover 122 insures that the side gears 128 and 134 splined to the axle shafts 36 and 46 respectively rotate in opposite directions relative to the rotation of the case and cover assembly 120—122. Since these pinions 126 and 132 have no bearings and are supported only on their peripheries within the gear pockets 124 and 130 the separating force between the gears due to tooth pressure angle applies a load between the peripheries of the gears and the internal surfaces of the gear pockets so that a frictional resistance load is applied to resist rotation of the differential gears. This frictional resistance varies with the torque applied so that at low torque, the resistance to the differentiating function is negligible. Also the axle shaft torque acting through side gears 128 and 134 imposes a load between pinion gears 132 and 126 and their respective pockets 130 and 124 and this force is added vectorially to the above-mentioned separating force. As the speed of rotation between the side gears 128 and 134 increases the force resisting the spinning of one of the side gears 36 and 46 relative to each other increases. At higher torques this thrust load becomes considerable and therefore considerable resistance to differential action is set up. This reluctance to differentiate so introduced removes some of the load imposed on the hydraulic unit when one wheel encounters poor traction and attempts to spin. The mechanical resistance thus imposed to relative rotation between the shafts 36 and 46 is added to force resisting relative rotation exerted by my improved hydraulic control.

The speed controlled hydraulic device for resisting spinning of one of the driving wheels is the same in structure and mode of operation as that described in connection with the Figs. 1 to 5 embodiment. The plungers 56 engaging the cam 28 splined to the shaft 46 function to resist rotational movement of the shaft relative to the case in proportion to the leakage of fluid through the plungers 56 as previously described.

I have illustrated my invention in connection with a device wherein fluid, oil, is supplied to the space within the rotatable assembly consisting of the case and cover members 14—16 by the pump driven by rotation of the rotatable assembly. It will of course be apparent that any desired fluid may be supplied to the cylindrical bores 54 from any desired source which need not be associated with the differential but can be supplied by any movable portion of the vehicle.

While my invention has been illustrated and described in connection with a device having a six lobed cam and a ten plunger braking structure to limit rotational movement between the differential case and the shafts, it will be apparent that the number of lobes on the cam and the number of plungers can be varied. The braking force exerted during each revolution may be computed by multiplying the displacement of each plunger determined by multiplying the area of the plunger by the displacement of the lobes of the cam, multiplied by the number of lobes on the cam; and multiplying the resultant by the number of plungers employed. Attention is directed to the fact that by using a large number of lobes on the cam and a large number of plungers it is possible to embody a high restraining force in a comparatively small area thereby adapting my invention for use in vehicle differentials with minimum changes in structure.

While my invention has been illustrated and described with particular reference to specific embodiments, it will be apparent that various changes may be made without departing from the spirit of my invention as defined by the following claims.

I claim:

1. In a fluid type locking differential for use with a power source, the combination of, a differential carrier adapted to be positioned in an axle housing; a differential case rotatably positioned in said carrier; a pair of side gears and differential pinion gears positioned in said differential case; a multi-lobed cam positioned adjacent one of said side gears; a plurality of openings extending through said differential case in alignment with said multi-lobed cam; a piston positioned in each of said openings; means for limiting travel of said pistons; each of said pistons having a restricted escape orifice therein; means for maintaining each of said pistons in contact with said multi-lobed cam; and fluid supply means; the restricted escape orifices in each of said pistons to control the quantity of fluid discharged, thereby limiting the relative movement thereof.

2. In a fluid type locking differential for use with a power source, the combination of, a differential carrier adapted to be positioned in an axle housing; a differential case rotatably positioned in said carrier; a pair of side gears and differential pinion gears positioned in said differential case; a multi-lobed cam positioned adjacent one of said side gears; a plurality of radial openings extending through said differential case and in alignment with said multi-lobed cam; a piston slidably positioned in each of said openings; each of said pistons having a calibrated orifice therein; means for maintaining each of said pistons in contact with said multi-lobed cam; a stop plug in the circumferential end of said openings for limiting travel of each of said pistons; fluid supply means; the calibrated orifices in each of said pistons controlling the quantity of fluid discharge, thereby limiting the relative rotation of the cam.

3. In a fluid actuated locking differential for use with a power source, the combination of, a differential carrier adapted to be positioned in an axle housing; a two part differential case rotatably positioned in said carrier; a pair of side gears and differential pinion gears positioned in said differential case; one side gear positioned in each part of said differential case; a multi-lobed cam positioned adjacent one of said side gears in one of said differential case parts; a plurality of cylindrical openings extending through said differential case and in perpendicular alignment with said multi-lobed cam; a piston operatively positioned in each of said openings; each of said pistons having a calibrated orifice therein; means for maintaining each of said pistons in contact with said cam; means for limiting the travel of said piston; fluid supply means; the calibrated orifices in said piston controlling the quantity of fluid discharged, thereby limiting the relative movement of the cam with respect to the differential case.

4. In a fluid type locking differential for use with a power source, the combination of, a differential carrier adapted to be positioned in an axle housing; a two part differential case rotatably positioned in said carrier; a pair of side gears and differential pinion gears positioned in said differential case; one side gear positioned in each part of said differential case; a multi-lobed cam positioned adjacent one of said side gears in one of said differential case parts; a plurality of cylindrical openings extending diametrically through said differential case, the central portions thereof terminating in perpendicular alignment with said multi-lobed cam; a cylindrical piston positioned in each of said openings; check valve means in each of said pistons; each of said pistons having a calibrated orifice therein; yieldable means for maintaining each of said pistons in contact with said cam; means for rendering said cylindrical openings fluid tight and limiting the travel of said pistons; fluid supply means; the calibrated orifices in said piston controlling the quantity of fluid discharged, thereby limiting the relative rotational movement of the cam.

5. In a fluid actuated locking differential for use with a power source, the combination of, a differential carrier adapted to be positioned in an axle housing; a two part differential case rotatably positioned in said carrier; a pair of side gears and differential pinion gears positioned in said differential case; one side gear positioned in the first section of said differential case; one side gear positioned in the second section of said differential case; a multi-lobed cam positioned in contact with said side gears in said first section of said differential case; a plurality of cylindrical openings in said first section of said differential case extending diametrically through and in alignment with said multi-lobed cam; a piston positioned in each of said openings; check valve means in each of said pistons; each of said pistons having a calibrated orifice therein; yieldable means for maintaining each of said pistons in contact with said cam; means for rendering said cylindrical openings fluid tight and for limiting the travel of said piston; fluid supply means; the calibrated orifices in said piston controlling the quantity of fluid discharged, thereby limiting the relative rotational movement of the cam.

6. In a fluid actuated locking differential for use with a power source, the combination of, a differential carrier adapted to be positioned in an axle housing; a differential case having body portion and cover member rotatably positioned in said carrier; a pair of axially disposed side gears and vertically disposed differential pinion gears positioned in toothed engagement in said differential case; the first side gear and two differential pinion gears positioned in said differential case body; a pocket in said cover member adapted to receive a multi-lobed cam; the second side gear in contact with the side of said cam; a plurality of radial openings extending through said differential case cover and in vertical alignment with said multi-lobed cam; a cylindrical piston positioned in each of said radial openings; each of said pistons having a calibrated orifice therein; yieldable means for maintaining each of said pistons in contact with said multi-lobed cam; stop means in the circumferential ends of said differential case cover for limiting travel of each of said pistons; fluid supply means; the calibrated openings in said piston controlling the quantity of fluid discharge, thereby limiting the relative rotation of the cam.

References Cited in the file of this patent

UNITED STATES PATENTS

| | | |
|---|---|---|
| 2,122,284 | Heumader | June 28, 1938 |
| 2,307,310 | Ballamy | July 9, 1940 |
| 2,397,374 | Schlicksupp | Mar. 26, 1946 |
| 2,722,140 | Cabell | Nov. 1, 1955 |
| 2,808,739 | Mueller | Oct. 8, 1957 |